Figure 1:
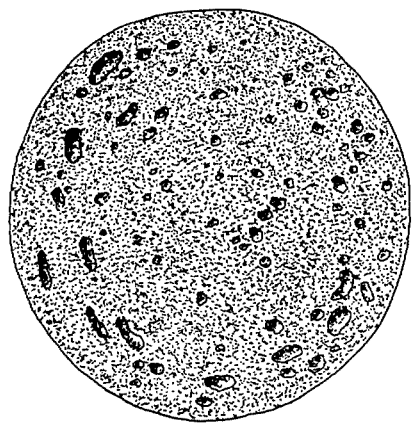
Figure 2:
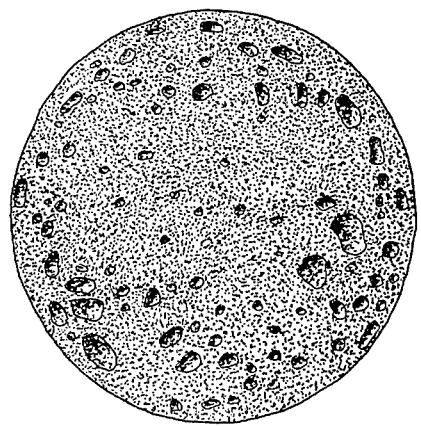
Figure 3:
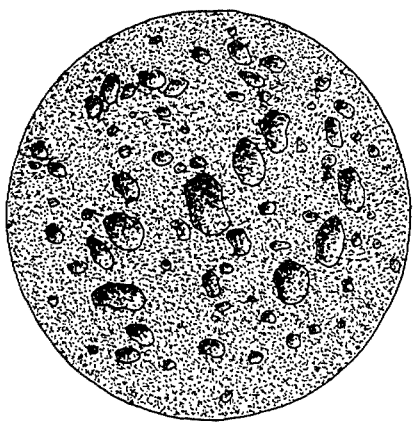

United States Patent [19]

Rucker et al.

[11] 4,109,023

[45] Aug. 22, 1978

[54] POROUS YEAST LEAVENED DOUGH PRODUCT

[75] Inventors: Dugan Allan Rucker, Kansas City, Mo.; Louis Albert Wollermann, Prairie Village; Jack Kern Krum, Leawood, both of Kans.

[73] Assignee: International Telephone and Telegraph Corporation, New York, N.Y.

[21] Appl. No.: 790,189

[22] Filed: Apr. 25, 1977

[51] Int. Cl.² .......................... A21D 2/14; A21D 2/36
[52] U.S. Cl. .......................... 426/549; 426/21; 426/25; 426/550; 426/653
[58] Field of Search ............ 426/62, 21, 25, 549, 426/550, 653

[56] References Cited

U.S. PATENT DOCUMENTS

| 3,556,805 | 1/1971 | Conn et al. | 426/653 X |
| 3,752,675 | 8/1973 | Tsen et al. | 426/62 X |

FOREIGN PATENT DOCUMENTS 310,774  2/1976  Japan .......................... 426/21

Primary Examiner—Raymond N. Jones
Assistant Examiner—Esther M. Kepplinger
Attorney, Agent, or Firm—James B. Raden; Harold J. Holt

[57] ABSTRACT

A yeast leavened dough product, such as an English muffin, having a high and uniform level of porosity contains as an additive therefor, for each 100 parts by weight of flour, from about 0.20 to 5.0 parts by weight of rice flour and from about 0.06 to 1.0 part by weight of fumaric acid.

4 Claims, 4 Drawing Figures

POROUS YEAST LEAVENED DOUGH PRODUCT

This invention relates to a porous yeast leavened dough product, such as an English muffin, of more uniform texture and improved porosity.

English muffins are a unique yeast leavened dough product of increasingly greater popularity. They are essentially the only dough product that the baker desires to be porous. In addition to their porosity, they are characterized by a very slightly sour taste and slightly "chewy" eating quality. The production of high quality English muffins encounters a number of problems, the most common of which is obtaining as uniformly porous a structure as possible. Other problems are a lack of proper balance between crumbliness on the one extreme, and the desired resiliency or "slightly chewy" characteristic on the other extreme, flavor deficiencies and inadequate uniformity from product to product.

It is a primary object of the present invention to provide a porous yeast leavened dough product of improved internal structure, including increased and more uniform porosity and elimination of break-like fine grain and fine cell structure.

It is a more specific object of this invention to provide an English muffin combining excellent flavor and uniform porosity with a less gummy, more chewy eating quality.

The foregoing and other objects of the invention are achieved by incorporating in the dough composition from which the English muffin or other porous yeast leavened dough product is prepared an additive comprising certain proportions of rice flour and fumaric acid. These ingredients have been used individually in the preparation of other yeast leavened dough products. Rice flour, for example, is frequently used as a component of dusting flours to coat dough balls before proofing in muffin manufacture. Fumaric acid has been suggested for use in reducing mixing time or as a "no-time" dough additive. However, as will be shown below, the use in combination of rice flour and fumaric acid in the proportions and manner herein set forth accomplishes a unique result with the present products.

Figure 4:
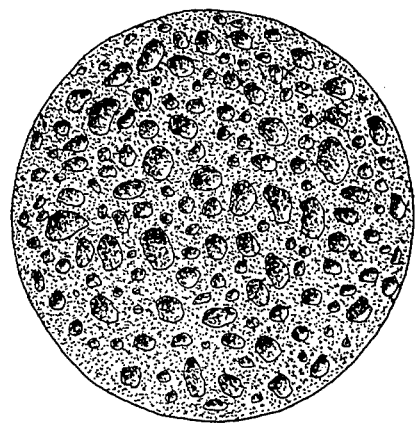

The invention will be better understood in connection with the accompanying drawing in which FIGS. 1-4 show four typical porosity grades in an English muffin, ranging progressively from very poor pososity in FIG. 1 to excellent porosity in FIG. 4.

An English muffin contains flour, water and yeast as necessary ingredients. The porosity is obtained by relatively high water content, normally from 75 to 82%, based on flour weight. In addition, an English muffin typically contains other additives such as white cultured sour or cider vinegar to provide a slightly acid (about pH 5) dough and a sour flavor, a preservative such as sodium or calcium propionate, salt, sugar, enzymes and shortening. English muffins and their preparation are described in detail at various places in the literature, as for example, in an article by E. M. Noel in *Baking Industry*, January/February 1972, beginning on page 23, which article is hereby incorporated by reference. Briefly, the muffins are prepared by mixing the ingredients, fermenting, dividing, proofing and baking. Before proofing, one side of the muffin is normally dusted with cornmeal or with a cornmeal-flour mixture. Baking is normally accomplished on a griddle where the muffins are browned on both the top and bottom with the sides remaining white but firm.

As used in the present specification and claims, the term "flour" unless otherwise modified identifies, in accordance with its commonly accepted meaning in the baking industry, dough forming flour, i.e., wheat, rye or triticale (a hybrid of wheat and rye) flour. Where "rice flour" is intended to be identified it is designated as such.

The following examples illustrate the practice of the invention. Unless otherwise indicated, all parts and percentages are by weight, parts being based upon 100 parts of flour.

EXAMPLE 1

English muffins were prepared from the following ingredients:

| Ingredient | % Flour Basis |
| --- | --- |
| Flour | 100.0 |
| Water | 76.00 |
| Vinegar (50 grain) | 4.00 |
| Salt | 1.75 |
| Sugar | 2.00 |
| Shortening | 1.00 |
| Fungal Enzymes | 1.00 |
| Yeast | 6.50 |
| Calcium Propionate | 0.50 |
| Fumaric Acid | Variable |
| Rice Flour | Variable |

The flour, water and other ingredients, except salt, were mixed for 3 minutes, the salt was added and mixing was continued another 3 minutes. The dough was fermented for 30 minutes in a fermentation cabinet at 80° F. and 90% relative humidity. The dough was then scaled into 70 gram pieces which were rounded, flattened and panned and then proofed at 110° F. and 90% relative humidity to ⅞ inch height. The muffins were then baked at 465° F. for 12 minutes.

A series of English muffins were prepared as set forth above containing from 0 to 0.5 percent of fumaric acid and from 0 to 2.0 percent of rice flour. The muffins were then graded in accordance with their porosity levels.

In order for an English muffin, or muffin loaf, to have an internal structure properly characterized as having "excellent porosity", the holes creating the porosity cannot be too large or too small and must be separated from each other in a uniform pattern. An English muffin with excellent porosity must have numerous medium sized holes uniformly distributed throughout the muffin. The samples prepared in accordance with Example 1 were assigned porosity grades or scores of from 1 to 8 in accordance with the following porosity levels:

| Grade | Porosity | Description |
| --- | --- | --- |
| 1 | Very poor | Fine bread-like grain, several very small holes |
| 2 | Very poor | Coarse bread-like grain, numerous very small holes |
| 3 | Poor | Few large holes, numerous very small holes |
| 4 | Fair | Several large holes, numerous very small holes |
| 5 | Good | Several large holes, numerous small holes |
| 6 | Good | Few medium holes, numerous small holes |
| 7 | Very good | Several medium holes, numerous small holes |
| 8 | Excellent | Numerous medium holes, few small holes |

The porosity grades for the various samples of Example 1 are set forth in the following table in which percentages of rice flour and fumaric acid are based upon what flour content.

TABLE 1

| Fumaric Acid % | Rice Flour % | | | | | | | | | | |
|---|---|---|---|---|---|---|---|---|---|---|---|
| | 0 | .063 | .125 | .188 | .25 | .375 | .50 | .75 | 1.0 | 1.5 | 2.0 |
| 0 | 1 | 1 | 1 | 1 | 1 | 2 | 2 | 2 | 2 | 2 | 2 |
| .063 | 3 | 3 | | | | | | | | | |
| .125 | 4 | 4 | 4 | 4 | 4 | 5 | 5 | 6 | 6 | 6 | 6 |
| .188 | 5 | | | | | 5 | 6 | | | | |
| .25 | 5 | 5 | 5 | 5 | 5 | 7 | 8 | 8 | 8 | 8 | 8 |
| .375 | 4 | | | | | | 6 | | 6 | | 7 |
| .50 | 3 | 3 | 4 | 4 | 5 | 5 | 5 | | 6 | 6 | |
| 1.00 | | | | | | | 3 | | | | |
| 2.00 | | | | | | | 0* | | | | |
| 3.00 | | | | | | | 0* | | | | |

*Dough did not proof; baked muffins were flat and similar in character to unleavened bread.

Additional tests were run with 0.25% fumaric acid and 3.0%, 6.0% and 9.0% rice flour respectively. The porosity grade remained at the 8 level for all three tests.

In the drawing, FIGS. 1-4 illustrate porosity grades 1, 3, 5 and 8 respectively. Grades 2, 4, 6 and 7 lie intermediate the grade levels illustrated. It will be seen from Table 1 that regardless of the amount of rice flour used alone, it was only marginally effective in improving the grade level. Fumaric acid alone led to an improved score by increasing porosity, but detracted from other qualities, such as volume and proof time, above a use level of about 0.35%. The table indicates a definite degree of synergism with the combined ingredients.

EXAMPLE 2

Further samples of English muffins were prepared in accordance with Example 1, substituting a variety of other dicarboxylic acids in place of fumaric acid. In all cases, 0.25% of the dicarboxylic acid was used with 0.50% rice flour. The results were as follows:

TABLE II

| Acid | Grade |
|---|---|
| Fumaric | 8 |
| Succinic | 5 |
| Adipic | 5 |
| Tartaric | 3 |
| Malic | 3 |
| Glutaric | 4 |

It will be seen that none of the acids achieved a result in combination with rice flour equivalent to that achieved with fumaric acid.

EXAMPLE 3

An additional series of samples of English muffins were prepared from the following formulation:

| Ingredient | % Flour Basis |
|---|---|
| Flour | 100.00 |
| Water | 80.00 |
| Yeast | 6.00 |
| Salt | 1.75 |
| Dextrose | 2.50 |
| Shortening | 2.00 |
| Ammonium Chloride | 0.003 |
| Sorbic Acid | 0.15 |
| Calcium Peroxide | 0.002 |
| Potassium Bromate | 0.0001 |
| Monocalcium Phosphate | 0.0028 |
| Fumaric Acid | Variable |
| Rice Flour | Variable |

The sorbic acid and calcium peroxide were added as processing aids and to improve crumb resiliency. Neither had any significant effect on porosity. The muffins were prepared as set forth in Example 1.

A number of samples of muffins were prepared from the above formulation containing respectively (1) neither fumaric acid nor rice flour, (2) 0.25% fumaric acid alone (3) 1.0% rice flour alone and (4) both 0.25% fumaric acid and 1.0% rice flour. The results were as follows:

TABLE III

| Sample | Muffin Additive | Grade |
|---|---|---|
| (1) | None | 1 |
| (2) | Fumaric Acid | 5 |
| (3) | Rice Flour | 2 |
| (4) | Fumaric Acid & Rice Flour | 8 |

The baked muffins containing fumaric acid exhibited some improvement in internal characteristics, i.e. an increase in porosity plus a desirable increase in flavor tartness. The muffins containing rice flour alone also had some improvement in internal characteristics, i.e., increased uniformity of porosity and more chewy, less gummy interior as compared to the no-rice flour controls. However, the baked English muffins containing the combined fumaric acid and rice flour exhibited excellent and uniform porosity, tart flavor and improved chewiness.

Samples were also prepared as set forth in Example 3 in which rice flour was replaced with sweet whey and with acid whey respectively. The samples also contained 0.25% fumaric acid. The baked muffins in all cases contained numerous large holes but were lacking in uniformity of porosity.

EXAMPLE 4

English muffins were prepared from two commercially available "English Muffin Mix" samples. The muffins prepared from these mixes were compared with English muffins prepared from the same mixes to which was added a mixture of rice flour and fumaric acid.

The first of the commercially available English muffin mixes, identified as Sample "A", carried the following ingredient legend: sugar, salt, calcium propionate, shortening, citric acid, starch and proteolytic enzymes. An English muffin was prepared with this mix from the following formultion:

| Ingredients | % Flour Basis |
|---|---|
| English Muffin Mix "A" | 6.0 |
| Yeast | 5.6 |
| Water | 82.4 |
| Gluten | 1.6 |
| Flour | 100.0 |
| Salt | 1.6 |

The second commercially available English muffin mix identified as Sample "B", carried the following ingredient legend: wheat flour, sugar, calcium propionate, leavening, enzyme blend and shortening. An English muffin was prepared with this mix from the following formulation:

| Ingredient | % Flour Basis |
|---|---|
| English Muffin Mix "B" | 13.0 |
| Yeast | 5.6 |
| Flour | 100.0 |

-continued

| Ingredient | % Flour Basis |
|---|---|
| Water | 84.0 |
| Salt | 1.6 |

The muffins were prepared from these formulations by mixing for 13–15 minutes all ingredients except the salt, adding the salt and continuing the mixing for another 3 minutes. The dough was then fermented, proofed and baked as in Example 1.

The above procedure was then repeated for each formulation with the addition of 0.75 lbs. of rice flour and fumaric acid mixture for each hundred weight of flour. This addition amounted to 0.50% rice flour and 0.25% fumaric acid based on the flour weight in the muffin formulations. The muffins from these four samples are identified below as Sample A (first commercial sample), Sample B (second commercial sample) and Sample A' and B' (the respective commercial samples containing the additive mixture of the invention). Their porosity score is set forth in Table IV.

TABLE IV

| Sample | | Grade |
|---|---|---|
| A | (without additive) | 2 |
| A' | (with additive) | 7 |
| B | (without additive) | 5 |
| B' | (with additive) | 7 |

It will be seen from the above table, that the combined additive of the invention improved the quality of muffins made from both commercial mixes and particularly that of Sample A.

In general, the rice flour may be used in amounts ranging from about 0.20 to 5.0 parts by weight per 100 parts of flour. Less than about 0.20 parts gives inadequate improvement in porosity. Optimum rice flour levels range from 0.25 to 3.0 parts. As the amount of rice flour is increased over 2 parts, there is little improvement in porosity level and amounts greater than 5 parts adversely affect the muffin texture. The fumaric acid should be used in amounts ranging from about 0.06 to 1.00 parts by weight per 100 parts of flour. Again, the lower limit is the amount necessary for adequate improvement in porosity levels. Amounts greater than 0.5 parts of fumaric acid tend to produce a more sour product and require larger amounts of rice flour. The optimum level of fumaric acid is from 0.10 to 0.50 parts per 100 parts of flour.

We claim:

1. A yeast leavened dough product having a high and uniform level of porosity containing for each 100 parts by weight of flour from about 0.20 to 5.0 parts by weight of rice flour and from about 0.06 to 1.0 part by weight of fumaric acid.

2. The product of claim 1, in which the yeast leavened dough product is an English muffin.

3. The product of claim 2, containing for each 100 parts by weight of flour from 0.25 to 3 parts by weight of rice flour and from 0.10 to 0.5 part by weight of fumaric acid.

4. An additive for producing a yeast leavened dough product having a high and uniform level of porosity, said additive comprising from about 0.20 to 5.0 parts by weight of rice flour and from about 0.06 to 1.0 part by weight of fumaric acid, said parts by weight of additive being based on 100 parts by weight of flour in said yeast leavened dough product.

* * * * *